(12) United States Patent
Yoneyama

(10) Patent No.: US 7,574,745 B2
(45) Date of Patent: Aug. 11, 2009

(54) INFORMATION PROCESSING APPARATUS, INFORMATION PROCESSING METHOD, COMPUTER-READABLE MEDIUM HAVING INFORMATION PROCESSING PROGRAM EMBODIED THEREIN, AND RESOURCE MANAGEMENT APPARATUS

(75) Inventor: Miki Yoneyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 898 days.

(21) Appl. No.: 11/054,590

(22) Filed: Feb. 10, 2005

(65) Prior Publication Data

US 2005/0193221 A1 Sep. 1, 2005

(30) Foreign Application Priority Data

Feb. 13, 2004 (JP) ............... 2004-036822
Jan. 13, 2005 (JP) ............... 2005-006651

(51) Int. Cl.
G06F 7/04 (2006.01)
G06F 11/30 (2006.01)
G06F 1/00 (2006.01)
G06F 15/177 (2006.01)
G06F 12/14 (2006.01)

(52) U.S. Cl. ......................... 726/27; 713/189
(58) Field of Classification Search .................... 726/27
See application file for complete search history.

(56) References Cited

U.S. PATENT DOCUMENTS 6,185,684 B1 * 2/2001 Pravetz et al. ............... 713/182

FOREIGN PATENT DOCUMENTS

| EP | 1176492 A2 * | 1/2002 |
|---|---|---|
| JP | 6-243018 | 9/1994 |
| JP | 2001-344245 | 12/2001 |
| JP | 2003-280990 | 10/2003 |

OTHER PUBLICATIONS

Basel Katt, Xinwen Zhang, Ruth Breu, Michael Hafner, Jean-Pierre Seifert, "A general obligation model and continuity: enhanced policy enforcement engine for usage control", Jun. 2008, SACMAT '08: Proceedings of the 13th ACM symposium on Access control models and technologies, pp. 123-132.*

* cited by examiner

Primary Examiner—Matthew B Smithers
Assistant Examiner—Courtney D Fields
(74) Attorney, Agent, or Firm—Oblon, Spivak, McClelland, Maier & Neustadt, P.C.

(57) ABSTRACT

There is disclosed an information processing apparatus for providing information on resources for which predetermined permission is given to a subject trying to access the resources. The information processing apparatus comprises a permission status information generating part to generate permission status information based on resource classification information, subject classification information, and rule information. The permission status information indicates whether the subject trying to access the resources has the predetermined permission to access the respective resources. The resource classification information includes information on classifications of the resources to be accessed. The subject classification information includes information on a classification of the subject trying to access the resources. The rule information defines a rule for the subject to access the resources with respect to a combination of the classifications of the resources and the classification of the subject.

36 Claims, 22 Drawing Sheets

| USER OR GROUP | DOCUMENT ACCESS PERMISSION | | | |
|---|---|---|---|---|
| | REFERENCE | READ | UPDATE | DELETE |
| USER A | O | O | O | O |
| USER B | O | O | O | |
| USER C | O | O | | |
| USER D | O | | | |

FIG.1

| USER OR GROUP | DOCUMENT ACCESS PERMISSION | | | |
|---|---|---|---|---|
| | REFERENCE | READ | UPDATE | DELETE |
| USER A | ○ | | | |
| USER B | ○ | ○ | ○ | ○ |
| USER C | ○ | ○ | ○ | |
| USER D | ○ | ○ | | |

FIG.2

| | DOCUMENT 1 | DOCUMENT 2 | DOCUMENT 3 | DOCUMENT 4 | ... | DOCUMENT N |
|---|---|---|---|---|---|---|
| USER A | ○ | × | ○ | × | ... | ○ |
| USER B | ○ | ○ | ○ | ○ | ... | × |
| USER C | ○ | × | ○ | ○ | ... | ○ |
| USER D | ○ | ○ | × | × | ... | × |

FIG.6

| | SECTION A | SECTION B | SECTION C |
|---|---|---|---|
| USER A | RELEVANT PERSON | | |
| USER B | | RELEVANT PERSON | |
| USER C | | RELEVANT PERSON | RELEVANT PERSON |
| USER D | RELEVANT PERSON | | RELEVANT PERSON |

FIG.7

| DOCUMENT NAME | CONFIDENTIAL LEVEL | SECTION IN CHARGE |
|---|---|---|
| DOCUMENT A | STRICTLY CONFIDENTIAL | SECTION A |
| DOCUMENT B | CONFIDENTIAL | SECTION A |
| DOCUMENT C | INTERNAL USE ONLY | SECTION A |
| DOCUMENT D | CONFIDENTIAL | SECTION B |

FIG.8

| | STRICTLY CONFIDENTIAL | CONFIDENTIAL | INTERNAL USE ONLY |
|---|---|---|---|
| RELEVANT PERSON | REFERENCE × (LOG) | REFERENCE ○ (LOG) | REFERENCE ○ (LOG) |
| | PRINT × | PRINT ○ (CONFIDENTIAL PRINTING·PRINT USER NAME·LOG) | PRINT ○ (LOG) |
| NON-RELEVANT PERSON | REFERENCE × | REFERENCE × | REFERENCE ○ (LOG) |
| | PRINT × | PRINT × | PRINT ○ (LOG) |

```
<Policy PolicyID="Policy1" >
    <Target>
        //SUBJECT, RESOURCE ACTION RULES IN POLICY
    </Target>
    <Rule RuleID="Rule1" Effect=Permit>
        <Target>
            <Subjects>
                <Subject>...</Subject>
            </Subjects>
            <Resources>
                <Resource>...</Resource>
            </Resources>
            <Actions>
                <Action>...</Action>
            </Actions>
        </Target>
    </Rule>
    <Rule RuleID="Rule2" Effect=Deny>
        <Target> //SUBJECT, RESOURCE, ACTION IN RULE</Target>
    </Rule>
</Policy>
```

FIG.10

| DOCUMENT NAME | USER NAME | ADDITIONAL PERMISSION |
|---|---|---|
| DOCUMENT 1 | USER A | REFERENCE |
| DOCUMENT 2 | USER B | REFERENCE/PRINT |

FIG.12

| USER A | DOCUMENT 1 | DOCUMENT 2 | DOCUMENT 3 | DOCUMENT 4 | ... | DOCUMENT N |
|---|---|---|---|---|---|---|
| | ○ | ○ | ○ | × | ... | ○ |

| DOCUMENT CATEGORY | CONFIDENTIAL LEVEL | USER LEVEL | USER CATEGORY | REFERENCE PERMISSION STATUS |
|---|---|---|---|---|
| CONFERENCE NOTE | INTERNAL USE ONLY | MANAGER | RELEVANT PERSON | 1 |
| " | " | MANAGER | ANY | 1 |
| " | " | PERMANENT EMPLOYEE | RELEVANT PERSON | 1 |
| " | " | PERMANENT EMPLOYEE | ANY | 1 |
| " | " | TEMPORARY EMPLOYEE | RELEVANT PERSON | 1 |
| " | " | TEMPORARY EMPLOYEE | ANY | 0 |
| " | " | ANY | ANY | 0 |
| " | ANY | ANY | ANY | 0 |
| SPECIFICATION | CONFIDENTIAL | MANAGER | RELEVANT PERSON | 1 |
| " | " | MANAGER | ANY | 0 |
| ... | ... | ... | ... | ... |
| ANY | ANY | ANY | ANY | 0 |

| USER LEVEL | USER CATEGORY | DOCUMENT 1 | DOCUMENT 2 | DOCUMENT 3 | DOCUMENT 4 | ... | DOCUMENT N |
|---|---|---|---|---|---|---|---|
| MANAGER | RELEVANT PERSON | 1 | 1 | 1 | 1 | ... | 1 |
| MANAGER | ANY | 1 | 1 | 0 | 1 | ... | 1 |
| PERMANENT EMPLOYEE | RELEVANT PERSON | 1 | 1 | 1 | 1 | ... | 1 |
| PERMANENT EMPLOYEE | ANY | 1 | 1 | 0 | 1 | ... | 0 |
| TEMPORARY EMPLOYEE | RELEVANT PERSON | 1 | 1 | 1 | 0 | ... | 0 |
| TEMPORARY EMPLOYEE | ANY | 0 | 1 | 0 | 0 | ... | 0 |
| ANY | ANY | 0 | 1 | 0 | 0 | ... | 0 |

| | DOCUMENT 1 | DOCUMENT 2 | DOCUMENT 3 | DOCUMENT 4 | ... | DOCUMENT N |
|---|---|---|---|---|---|---|
| USER A | 1 | 0 | 1 | 0 | ... | 1 |
| GROUP A | 1 | 1 | 1 | 0 | ... | 0 |

FIG.22

| | DOCUMENT 1 | DOCUMENT 2 | DOCUMENT 3 | DOCUMENT 4 | ... | DOCUMENT N |
|---|---|---|---|---|---|---|
| USER A | 1 | 0 | 0 | 0 | ... | 1 |
| GROUP A | 1 | 0 | 1 | 0 | ... | 0 |

| DOCUMENT CATEGORY | CONFIDENTIAL LEVEL | USER LEVEL | USER CATEGORY | REFERENCE PERMISSION STATUS |
|---|---|---|---|---|
| CONFERENCE NOTE | INTERNAL USE ONLY | MANAGER | OWNER | 1 |
| " | " | MANAGER | RELEVANT PERSON | 1 |
| " | " | MANAGER | ANY | 1 |
| " | " | PERMANENT EMPLOYEE | OWNER | 1 |
| " | " | PERMANENT EMPLOYEE | RELEVANT PERSON | 1 |
| " | " | PERMANENT EMPLOYEE | ANY | 1 |
| " | " | TEMPORARY EMPLOYEE | OWNER | 1 |
| " | " | TEMPORARY EMPLOYEE | RELEVANT PERSON | 1 |
| " | " | TEMPORARY EMPLOYEE | ANY | 0 |
| " | ANY | ANY | ANY | 0 |
| CONFERENCE NOTE | CONFIDENTIAL | MANAGER | OWNER | 1 |
| SPECIFICATION | " | MANAGER | RELEVANT PERSON | 1 |
| ... | ... | ... | ... | ... |
| ANY | ANY | ANY | ANY | 0 |

| USER LEVEL | USER CATEGORY | DOCUMENT 1 | DOCUMENT 2 | DOCUMENT 3 | DOCUMENT 4 | ... | DOCUMENT N |
|---|---|---|---|---|---|---|---|
| MANAGER | OWNER | 1 | 1 | 1 | 1 | ... | 1 |
| MANAGER | RELEVANT PERSON | 1 | 1 | 1 | 1 | ... | 1 |
| MANAGER | ANY | 1 | 1 | 0 | 1 | ... | 1 |
| PERMANENT EMPLOYEE | OWNER | 1 | 1 | 1 | 1 | ... | 1 |
| PERMANENT EMPLOYEE | RELEVANT PERSON | 1 | 1 | 1 | 1 | ... | 1 |
| PERMANENT EMPLOYEE | ANY | 1 | 1 | 0 | 1 | ... | 0 |
| TEMPORARY EMPLOYEE | OWNER | 1 | 1 | 1 | 1 | ... | 1 |
| TEMPORARY EMPLOYEE | RELEVANT PERSON | 0 | 1 | 1 | 0 | ... | 0 |
| TEMPORARY EMPLOYEE | ANY | 0 | 1 | 0 | 0 | ... | 0 |
| ANY | ANY | 0 | 1 | 0 | 0 | ... | 0 |

INFORMATION PROCESSING APPARATUS, INFORMATION PROCESSING METHOD, COMPUTER-READABLE MEDIUM HAVING INFORMATION PROCESSING PROGRAM EMBODIED THEREIN, AND RESOURCE MANAGEMENT APPARATUS

BACKGROUND OF THE INVENTION

1. Field of the Invention

The present invention generally relates to an information processing apparatus, an information processing method, a computer-readable medium having an information processing program embodied therein, and a resource management apparatus, and particularly relates to an information processing apparatus, information processing method, a computer-readable medium having an information processing program embodied therein, and a resource management apparatus for efficiently providing information on a resource.

2. Description of the Related Art

In computer systems, access permission is generally set for each resource to prevent unauthorized use of the resources. Data defining such access permission are commonly called as ACL (Access control list). FIG. 1 is a conceptual diagram of an ACL for a document management system. In the ACL in FIG. 1, permission for reference, read, update, and delete is defined on a user or group basis. By setting such ACL for each document, the document management system protects the documents.

In this type of document management system, when a document search is requested by a client, a result list must be generated so as to display only the documents to which the client has reference permission. However, accessing the ACLs set for each document during the search incurs high cost. To avoid such waste, some systems generate a bit sequence (hereinafter referred to as "bit mask") indicating reference permission status of each user, i.e., which user has reference permission to which document in advance.

A conceptual diagram of the bit mask is shown in FIG. 2. When a search is requested, the system can check whether the reference permission is given to a user who requested the search with reference to the bit mask generated in advance. The system can thus quickly output a search result.

On the other hand, in some cases, access permission to documents are controlled in various types of systems (distribution system, print system, etc.) according to common rules. For example, by sharing security information among the systems, the access permission is controlled based on the security information. In this case, for the consistency with these systems, a document management system determines access permission to the document based on the security information stored in an external apparatus in place of an ACL stored (as, for example, document attribute) in the document management system. The term "security information" is used to mean a set of plural pieces information including, for example, user attribute (section to which a user belongs, position, etc.), document attribute (document category, confidential level, etc.) and information indicating the status of access permission with respect to each combination of the user attribute and the document attribute.

Japanese Patent Laid Open Publication No. 2001-344245 discloses an information processing apparatus that generates an index associated with file information and permission information to search for documents based on the index. The apparatus thereby acquires the documents in consideration of access permission. Japanese Patent Laid Open Publication No. 06-243018 discloses a system that has permission information, for each document, containing information on security management according to a classification, and manages the security of the documents based on the permission information. Japanese Patent Laid Open Publication No. 2003-280990 discloses a document management apparatus that stores access permission setting information associated with user attribute information for every document and folder. The apparatus checks instructions described in an access request from a user with reference to the access permission setting information, and permits the access under corresponding setting conditions.

When checking the access permission to a document for a user with such security information, however, the system needs to refer to plural pieces of information (user attribute, documents attribute, etc.). Therefore, the mechanism for checking the permission is complicated. In addition, if the security information is stored in a location connected to the document management system via a network, the system needs to check the access permission via the network when a search is requested. Such a condition lowers the search performance.

SUMMARY OF THE INVENTION

A general object of the present invention is therefore to provide an information processing apparatus, an information processing method, a computer-readable medium having an information processing program embodied therein, and a resource management apparatus to solve at least one problem mentioned above. A specific object of the present invention is to provide an information processing apparatus, an information processing method, a computer-readable medium having an information processing program embodied therein, and a resource management apparatus that can provide information on resources for which reference permission is given to a subject trying to access the resources.

To achieve these and other objects of the present invention, there is provided an information processing apparatus, comprising a permission status information generating part to generate permission status information based on resource classification information, subject classification information, and rule information. Herein, the permission status information indicates whether a subject trying to access resources has predetermined access permission to the respective resources. The resource classification information includes information on classifications of the resources to be accessed. The subject classification information includes information on a classification of the subject trying to access the resources. The rule information defines a rule for the subject to access the resources with respect to a combination of the classifications of the resources and the classification of the subject.

This information processing apparatus can generate the permission status information indicating the status of the predetermined access permission based on plural pieces of information such as the resource classification information, the subject classification information and the rule information. Therefore, when a resource search is requested, the apparatus can efficiently provide information on resources for which predetermined permission is given to a subject who makes the search request by utilizing the permission status information.

There is also provided an information processing apparatus, comprising a permission status information generating part to generate second permission status information indicating whether a subject has predetermined permission to access resources, based on: first permission status information indicating the status of the predetermine permission on a resource basis in accordance with whether at least the subject has a predetermined first relation with respective resources, based on resource classification information on classifications of the resources to be accessed and rule information defining a rule for the subject to access the resources with respect to a combination of the classifications of the resources and a classification of the subject trying to access the resources; and first relation status information indicating whether the subject has the predetermined first relation with the respective resources, based on the resource classification information and subject classification information on the classification of the subject.

This information processing apparatus can generate the same permission status information as the former information processing apparatus at high speed.

There is also provided a resource management apparatus to manage predetermined resources, comprising a searching part to extract, in response to a request for information on a list of the resources, the resources for which predetermined access permission is given to a subject who makes the request based on the permission status information generated by the above-described information processing apparatus, and to provide information on a list of the extracted resources.

This resource management apparatus can efficiently provide information on the resources for which predetermined permission is given to the subject who makes the search request by utilizing the permission status information generated by the information processing apparatus.

The objects of the present invention is also achieved by an information processing method executable by the information processing apparatus, and a computer-readable medium having an information processing program embodied therein for executing the information processing method in the information processing apparatus.

The information processing apparatus, information processing method, computer-readable medium having an information processing program embodied therein, and the resource management apparatus make it possible to efficiently provide information on resources for which predetermined permission is given to a subject trying to access the resources.

BRIEF DESCRIPTION OF THE DRAWINGS

FIG. 1 is a conceptual diagram of an ACL for a document management system;

FIG. 2 is a conceptual diagram of a bit mask;

FIG. 6 shows an example of a user profile;

FIG. 7 shows an example of a document profile;

FIG. 8 shows an example of a policy;

FIG. 9 shows an example of a definition in XACML;

FIG. 10 shows an example of a certificate;

FIG. 12 shows an example of a generated bit mask;

FIG. 16 shows an example of a high-speed determination table according to the second embodiment;

FIG. 17 shows an example of a ULUC mask table according to the second embodiment;

FIG. 18 shows an example of a relevant person mask table according to the second embodiment;

FIG. 22 shows an example of an owner mask table according to the third embodiment;

FIG. 23 shows an example of a high-speed determination table according to the third embodiment;

FIG. 24 shows an example of a ULUC mask table according to the third embodiment.

DETAILED DESCRIPTION OF THE PREFERRED EMBODIMENT

Figure 3:
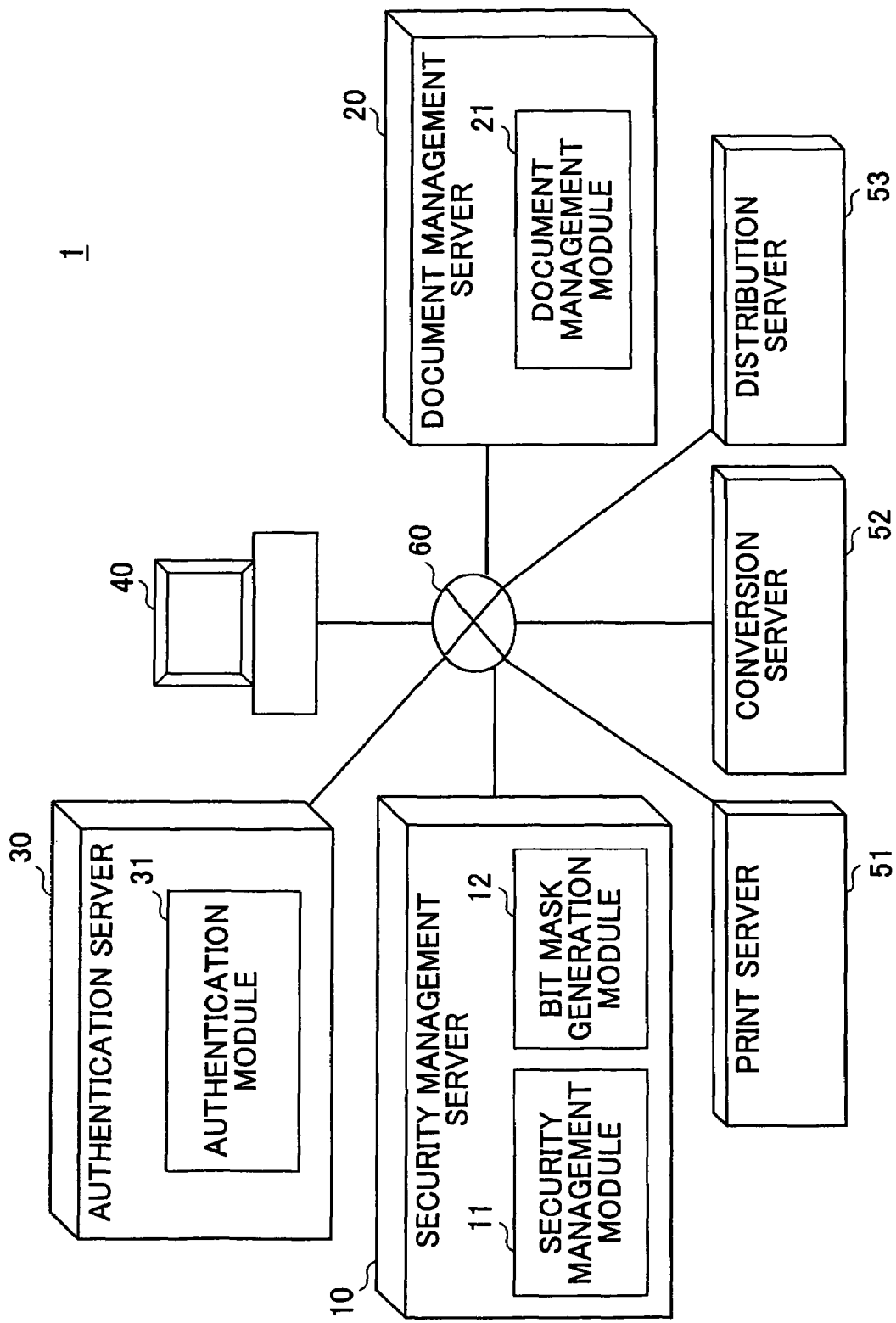
FIG. 3 is a schematic diagram showing a document management system according to an embodiment of the present invention.

The following description provides exemplary embodiments of the present invention with reference to the accompanying drawings. FIG. 3 is a schematic diagram showing a document management system 1 according to an embodiment of the present invention. As shown in FIG. 3, the document management system 1 of this embodiment comprises a security management server 10, a document management server 20, an authentication server 30, a client 40, a print server 51, a conversion server 52, a distribution server 53, and a network 60 such as the Internet or a LAN (Local Area Network) interconnecting these devices.

The security management server 10 is a computer that manages various information items on document security (hereinafter referred to as "security information"). The servers handling documents (the document management server 20, the print server 51, the conversion server 52, and the distribution server 53) in the document management system 1 determine access permission to the document for each user based on the security information managed in the security management server 10. The security management server 10 includes a security management module 11 and a bit mask generation module 12 and the like. The security management module 11 has a management function for the various security information. The bit mask generation module 12 has a function for generating a bit sequence (hereinafter referred to as "bit mask") indicating reference permission status for each user, i.e., which user has reference permission to which document.

The document management server 20 is a computer with a document management module 21 that manages documents (i.e., offers functions for saving documents, searching stored documents, and updating and deleting documents, etc.) When a document search is requested, the document management module 21 quickly outputs a search result using the bit mask generated by the bit mask generation module 12.

The authentication server 30 is a computer with an authentication module 31 for authenticating a user of the document management system 1. The authentication module 31 authenticates a user in response to an authentication request, and issues a digital certificate (hereinafter referred to as "ticket") to certify that the user is authenticated if the user is authenticated.

The print server 51, the conversion server 52 and the distribution server 53 are examples of various servers for handling the documents managed by the document management server 20. The print server 51 is a computer with a function for commanding a printer to print documents. The conversion server 52 is a computer with a function for converting documents into a specific data format. The distribution server 53 is a computer with a function for delivering documents to a specific destination.

The client 40 is a computer having applications installed therein for using the functions of these various servers. The client 40 is not limited to a terminal that is directly operated by a user, and may be, for example, a Web server. In this case, applications installed in the client 40 are Web applications.

Figure 4:
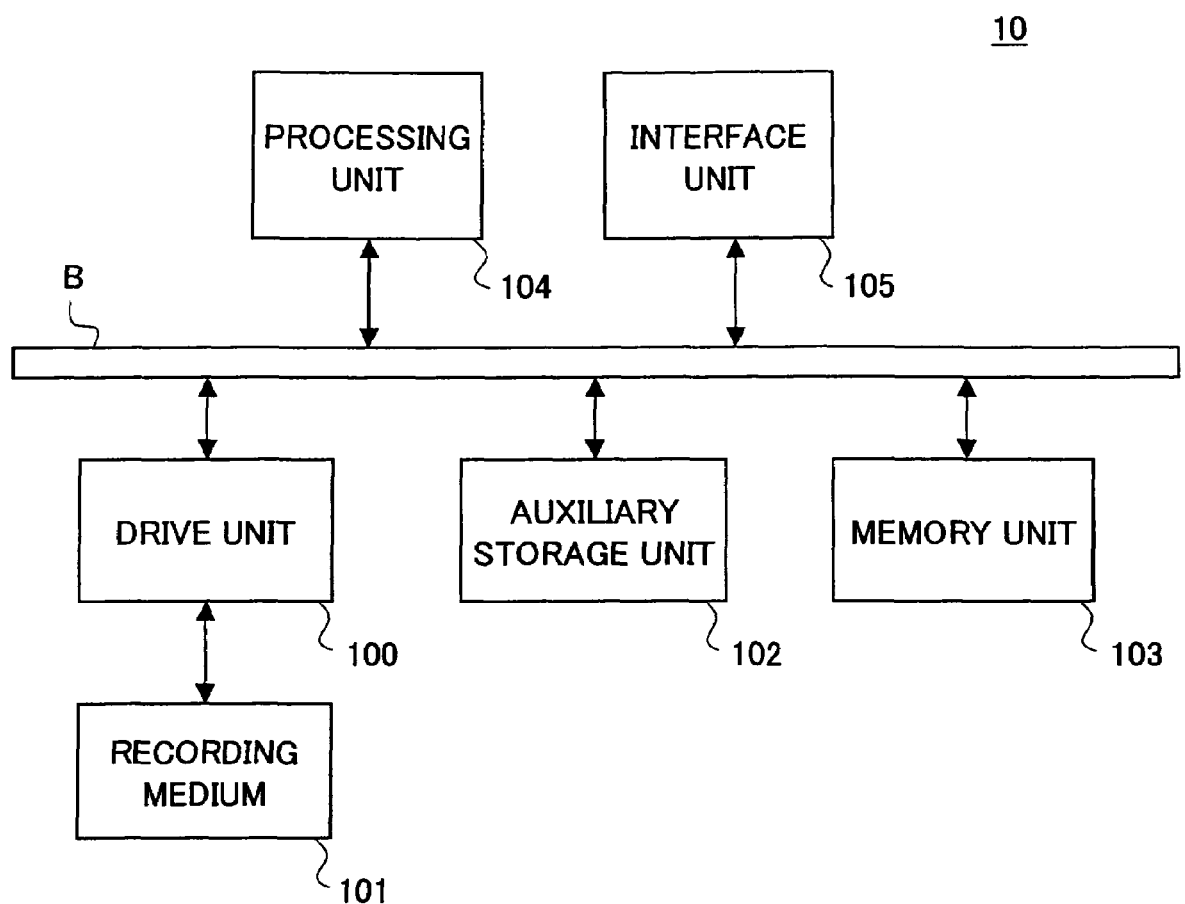
FIG. 4 is a block diagram showing hardware of a security management server according to an embodiment of the present invention.

The following is a detailed description of the security management server 10. FIG. 4 is a block diagram showing hardware of the security management server 10 according to an embodiment of the present invention. The security management server 10 in FIG. 4 comprises a drive unit 100, an auxiliary (secondary) storage unit 102, a memory unit 103, a processing unit 104, an interface unit 105, and a bus B interconnecting these units.

A recording medium 101 such as a CD-ROM provides a program for executing operations in the security management server 10. When the recording medium 101 with the program recorded thereon is loaded in the drive unit 100, the program is installed in the auxiliary storage unit 102 from the recording medium 101 via the drive unit 100.

The auxiliary storage unit 102 stores the installed program as well as necessary files and data. For example, the auxiliary storage unit 102 stores various tables (to be described later) necessary for execution of the program. The memory unit 103, in response to a command for starting a program, reads out the program from the auxiliary storage unit 102 and holds the program therein. The processing unit 104 executes a function in the security management server 10 according to the program held in the memory unit 103. The interface unit 105 is, for example, a modem or a router, and is used for connecting the security management server 10 to the network 60 of FIG. 3.

Figure 5:
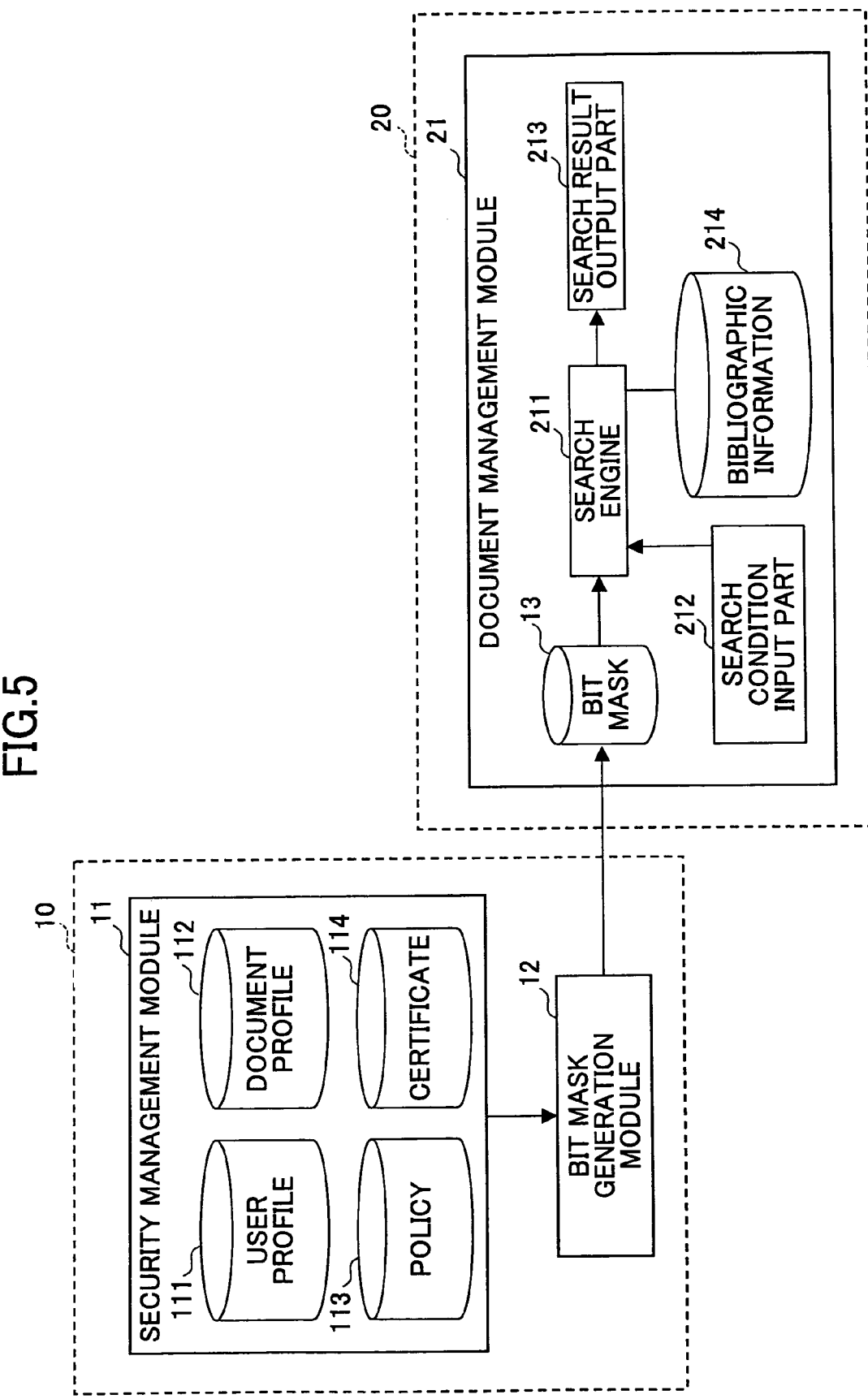
FIG. 5 is a functional diagram of a security management server and a document management server according to a first embodiment.

FIG. 5 is a functional diagram of a security management server 10 and a document management server 20 according to a first embodiment. As shown in FIG. 5, a security management module 11 of the security management server 10 manages a user profile 111, a document profile 112, a policy 113, a certificate 114 and the like. Theses elements correspond to the previously mentioned security information.

FIG. 6 shows an example of the user profile 111. As shown in FIG. 5, the user profile 111 is information that classifies users by their relevant sections, or defines which user is relevant to which sections (section A, section B, section C). For example, in the user profile 111, it is defined that a user A is a person relevant to the section A, but is not relevant to the sections B and C. The term "a person relevant to a section" used herein shall mean, for example, a person belonging to the section or a person involved in a project in the section.

FIG. 7 shows an example of the document profile 112. As shown in FIG. 7, the document profile 112 is information that classifies documents by their confidential level, or defines a document name, a confidential level, and a section in charge. The document name is a name given to a document. The confidential level is a security level of the document. The section in charge is the name of a section in charge of the document. For example, in the document profile 112, a document 1 is a strictly confidential document and a section A is in charge thereof.

FIG. 8 shows an example of the policy 113. As shown in FIG. 8, the policy 113 is information defining rules for a user to access resources with respect to each combination of user classification (relevant or non-relevant) and "resource" classification (confidential level) For example, if the policy 113 is applied, a relevant person is not permitted to refer to or print a strictly confidential document, but is permitted to refer to and print a confidential document and a document for internal use only according to the policy 113. The definition in brackets is an "obligation". The obligation is an operation that must be executed at the time of access to a resource. In this case, although the relevant person is permitted to refer to or print a confidential document, the person is required to generate a log when referring to the document, and is required to print his/her name on the document and generate a log when printing out the document.

The policy 113 may be defined in a policy description language, i.e., XACML (extensible Access Control Markup Language). FIG. 9 shows an example of a definition 113a in XACML. In the XACML definition 113a in FIG. 9, a part enclosed by Policy tags 1131 corresponds to a definition of a policy. The policy contains one or more rules enclosed by Rule tags such as rules 1132 and 1133 in FIG. 9. According to the rule 1132, access is permitted if the value of an Effect attribute in the Rule tag is "Permit". If the value of an Effect attribute in the Rule tag is "Deny", the access is not permitted.

A target to which the rules are applied is defined at a part enclosed by Target tags. The target contains a subject, a resource and an action respectively in descriptions 1134, 1135 and 1136. The subject defined in the description 1134 has permission for the action defined in the description 1135 to the resource defined in the description 1135.

FIG. 10 shows an example of the certificate 114. The certificate 114 is information defining exceptional permission (hereinafter referred to as "additional permission") that is not defined in the policy 113. The certificate 114 in FIG. 10 contains information on every document to which additional permission is set, with the name of the documents, names of users who have additional permission, and types of permission. For example, the certificate 114 defines that reference permission to a document 1 is exceptionally given to a user A. When, for instance, a user not allowed to have permission in the policy 113 participates in a specific project, the user can temporarily have specific permission with the certificate 114.

Referring back to FIG. 5, the document management module 21 comprises a search engine 211, a search condition input part 212, a search result output part 213, and bibliographic information 214. The bibliographic information 214 is information on a bibliography of managed documents. The search engine 211 has a function of searching for documents, which meet conditions entered in the search condition input part 212, in the bibliographical information 214. In the document search, the search engine 211 quickly extracts only the documents for which reference permission is given to a user who requests the search using the bit mask 13 generated by the bit mask generation module 12. The search condition input part 212 is a function for receiving a search condition from a client and inputting the search condition into the search engine 211. The search result output part 213 is a function for outputting a list of documents retrieved by the search engine 211 to the client.

Figure 11:
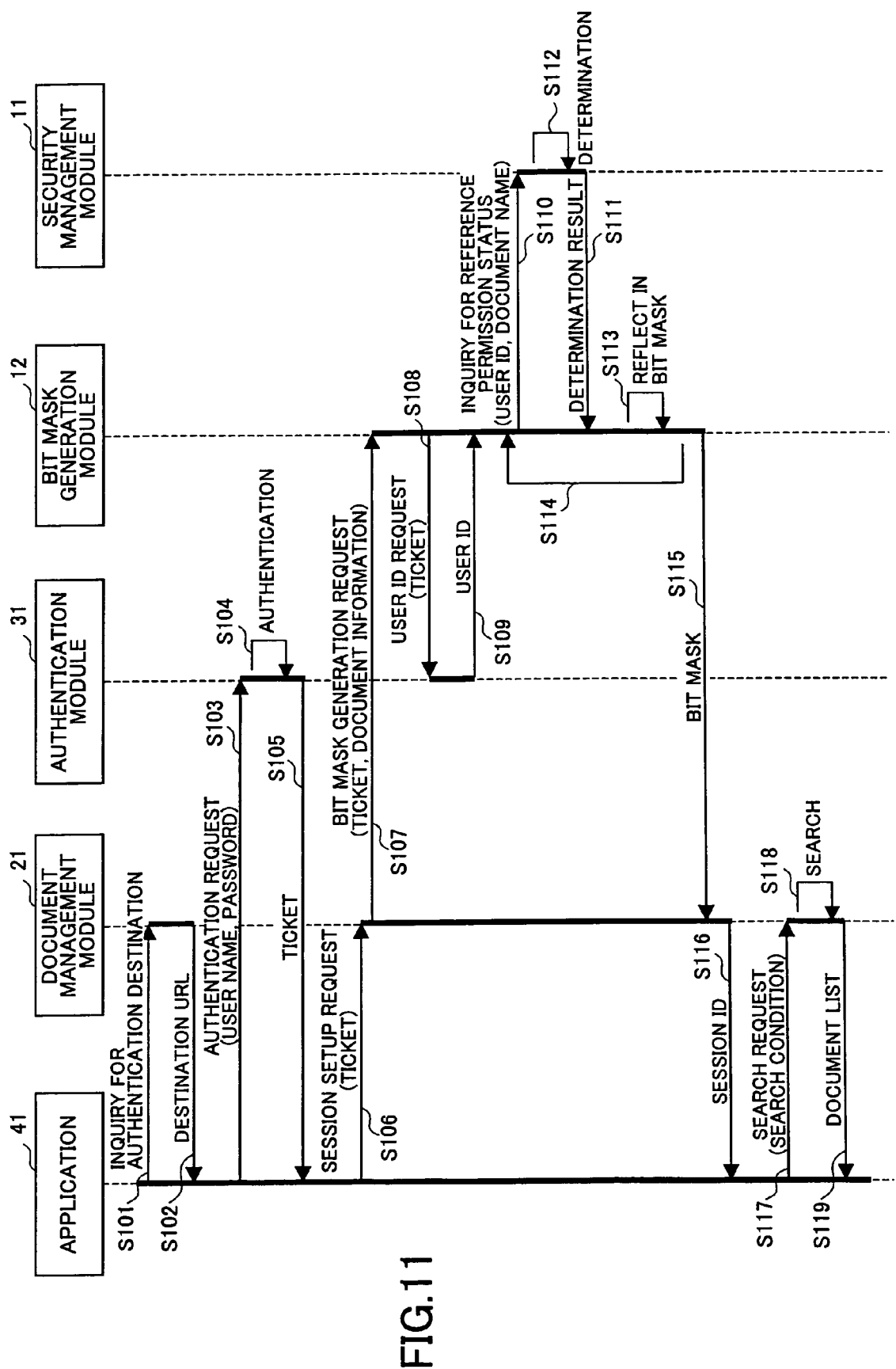
FIG. 11 is a first sequence diagram showing operations in a document search in the document management system according to the first embodiment.

The following describes operating procedures of the document management system 1 in FIG. 3. FIG. 11 is a first sequence diagram showing operations in a document search in the document management system 1 according to the first embodiment. The operations shown in FIG. 11 are executed according to instructions for a document search from a user. It is assumed that a user has already entered a user name and a password for starting an application 41 installed in the client 40.

In step S101, when the application 41 queries the document management module 21 for an authentication module allocated for the authentication of the application 41, the document management module 21 transmits a URL (destination URL) of the authentication module 31 to the application 41 (step S102). The operation then proceeds from step S102 to step S103, wherein the application 41 requests a user authentication from the authentication module 31 based on the destination URL transmitted from the document management module 21. The user authentication is requested with the presentation of the user name and the password entered by the user.

The operation then proceeds from step S103 to step S104, wherein the authentication module 31 authenticates the user and generates a ticket to certify that the user is authenticated. The ticket includes a ticket ID to identify the ticket as well as information on available services indicating services available with the ticket, validated date indicating until when the services are available with the ticket, a user ID, and a code for checking falsification. The ticket is encrypted so that only the authentication module 31 can refer to the contents of the ticket.

The operation then proceeds from step S104 to step S105, wherein the authentication module 31 transmits the ticket to the application 41. The operation then proceeds from step S105 to step S106, wherein the application 41 sends a request, with presentation of the ticket, for a setup of a session to the document management module 21. The operation then proceeds from step S106 to step S107, wherein the document management module 21 sends a request for the generation of the bit mask 13 to the bit mask generation module 12. The generation of the bit mask is requested with the presentation of ticket and information on the list of documents for which the bit mask is to be generated.

The operation then proceeds from step S107 to S108, wherein the bit mask generation module 12 queries, with presentation of the ticket, the authentication module 31 for the user ID of the current user. The authentication module 31 identifies the user ID based on the ticket, and transmits the user ID to the bit mask generation module 12 (S109).

The operation then proceeds from step S109 to step S110, wherein the bit mask generation module 12 sends a query, with presentation of the user ID and a name of a document (hereinafter referred to as "current document"), for the reference permission status of the user to the current document. The operation then proceeds from step S110 to step S111, wherein the security management module 11 determines the reference permission status of the user to access the current document based on the user profile 111, the document profile 112, the policy 113, and the certificate 114. The determination result (the reference permission status indicating whether the reference is permitted) is output to the bit mask generation module 12 (S112).

The operation then proceeds from step S112 to step S113, wherein the bit mask generation module 12 reflects the determination result in a bit for the current document in the bit mask 13. For instance, if the user has the reference permission, the value of the bit is set to "1" (ON). Subsequently, the bit mask generation module 12 queries for the reference permission to all the remaining documents to complete the bit mask 13 (S114). The operation then proceeds from step S114 to S115, wherein the bit mask generation module 12 transmits the completed bit mask 13 for the current document to the document management module 21.

FIG. 12 shows an example of the generated bit mask 13. As shown in FIG. 12, the bit mask 13 comprises a bit sequence having bits corresponding to documents for indicating the reference permission status to the documents. The bit mask 13 thus shows the reference permission status of a user A to each document in a corresponding bit.

The operation then proceeds from step S115 to S116, wherein the document management module 21, retaining the bit mask 13, transmits a session ID to the application 41 to answer the session setup request.

The operation then proceeds from step S116 to S117, wherein the application 41 requests, with presentation of the search conditions entered by the user, for a document search. The search engine 211 of the document management module 21 searches for documents that meet the search conditions in the bibliographic information 21, extracts only the documents whose bit in the bit mask 13 is ON from the search result, and generates a list including only the documents for which reference permission is given to the current user (S118).

The operation then proceeds from step S118 to S119, wherein the document management module 21 transmits the generated document list to the application 41. Thereafter, if new search conditions are entered in the same session, the operations only in step S117 through step S119 are executed. As such, only the documents to which the user has reference permission can be quickly extracted without accessing the user profile 111, the document profile 112, the policy 113 and the certificate 114 using the bit mask 13.

Figure 13:
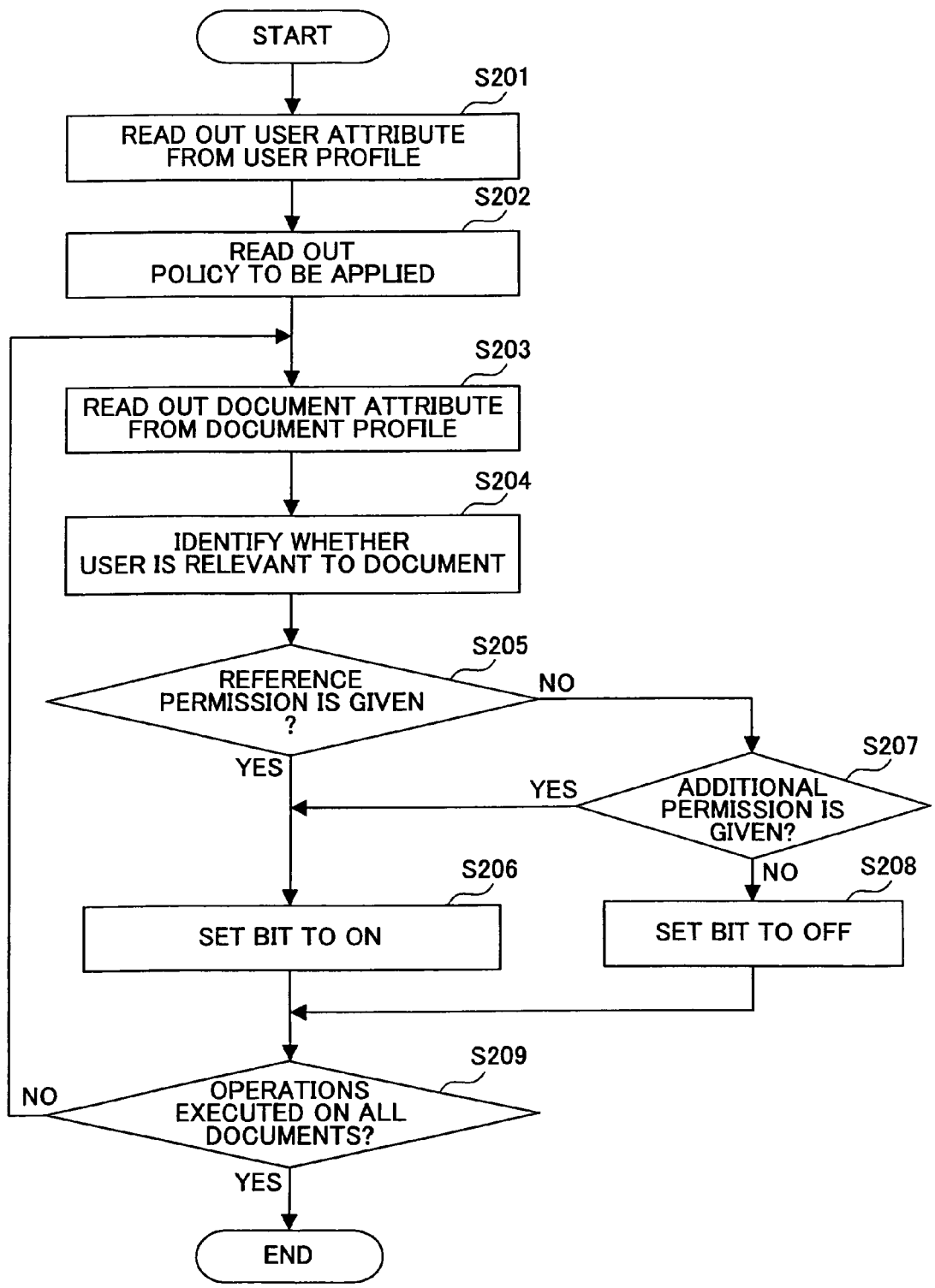
FIG. 13 is a flowchart showing operations for generating a bit mask according to the first embodiment.

The following is a detailed description of the operations for generating the bit mask 13. FIG. 13 is a flowchart showing the operations for generating the bit mask 13 according to the first embodiment. The operations shown in FIG. 13 correspond to the operations in step S111 through step S114 that are executed after the above-described step S110 wherein the bit mask generation module 12 queries the security management module 11 for the reference permission status of the current user to the current document.

In step S201, the security management module 11 reads out information on the current user from the user profile 111 (FIG. 6) and identifies a section to which the current user is relevant. For example, if the current user is "user A", the user is identified as a person relevant to the section A. The operation then proceeds from step S201 to step S202, wherein the security management module 11 reads out the policy 113 (FIG. 8). The operation then proceeds from step S202 to step S203, wherein the security management module 11 reads out the information on the current document from the document profile 112 (FIG. 7) to identify the confidential level of the current document and the section in charge thereof. For example, if the current document is "document 1", the confidential level is identified as "strictly confidential" and the section in charge is identified as "section A".

The operation then proceeds from step S203 to step S204, wherein the security management module 11 identifies whether the current user is relevant to the current document. For example, if the section to which the current user is relevant is identical to the section in charge of the document, the current user is relevant to the current document. If not, the current user is not relevant to the current document. Therefore, the user A is identified as a person relevant to the document 1.

The operation then proceeds from step S204 to step S205, wherein the security management module 11, with reference to the policy 113, determines whether the current user has the reference permission to the current document based on information indicating whether the current user is a person relevant to the current document and the confidential level of the document. For example, based on the information indicating that the user A is relevant to the document 1 and the document 1 is a strictly confidential document, the user A is not determined to have the reference permission to the document 1. The security management module 11 informs the bit mask generation module 12 of this determination result.

If the current user is determined to have the reference permission to the current document, the operation then proceeds from step S205 to step S206. In step 206, the bit mask generation module 12 sets the bit corresponding to the current document to ON.

If the current user is not determined to have the reference permission to the current document, the operation then proceeds from step S205 to step S207. In step 207, the security management module 11 checks whether the current user has additional permission for the reference of the current document 1 with reference to the certificate 114 (FIG. 10), and determines whether the current user has the reference permission to the current document. For example, reference permission to the document 1 is given to the user 1, so that the user A is determined to have the reference permission to the document 1. The security management module 11 informs the bit mask generation module 12 of this determination result, and the bit mask generation module 12 reflects the result in the bit mask 13 (S206, S208).

When the operations in steps S203 through S208 are executed on all the documents (S209), the operations for generating the bit mask are ended.

Figure 14:
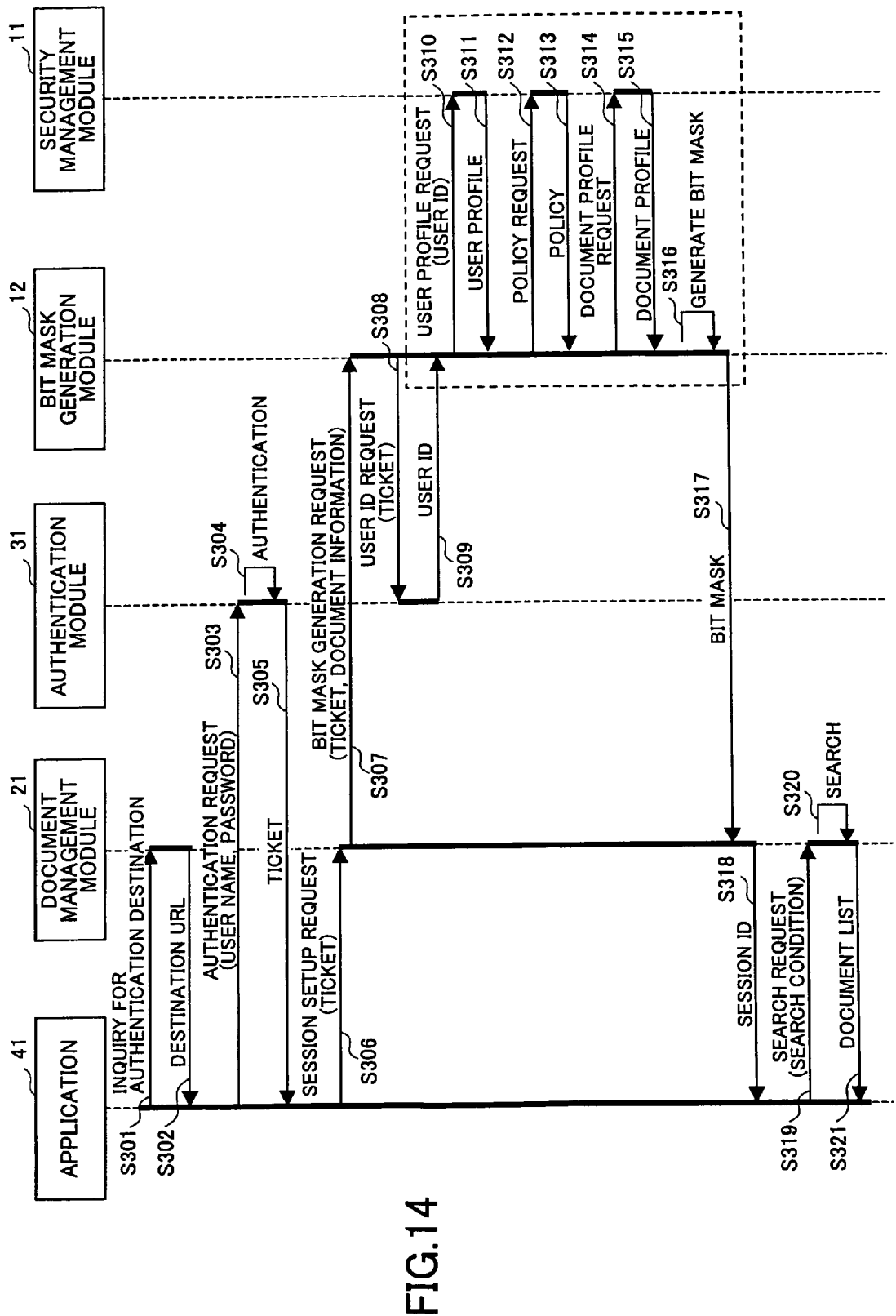
FIG. 14 is a second sequence diagram showing operations in a document search in the document management system according to the first embodiment.

In FIG. 11, in place of the security management module 11, the bit mask generation module 12 may determine the reference permission status to allow the security management module 11 to specialize in the management of the security information. FIG. 14 shows the operations sequence for such case. FIG. 14 is a second sequence diagram showing operations for a document search in the document management system according to the first embodiment;

In FIG. 14, steps S310 through S316 are substitutions for steps S111 through S114 in FIG. 11, and operations except these are the same as in FIG. 11. Therefore, only steps S310 thorough S316 are discussed below.

In step S310, the bit mask generation module 12, with presentation of the user ID, requests the information on the current user in the user profile 111 from the security management module 11, the security management module 11 retrieves the information from the user profile 111 and outputs the information to the bit mask generation module 12 (S311).

The operation then proceeds from step S311 to S312, wherein the bit mask generation module 12 requests the policy 113 from the security management module 11. The security management module 11 outputs the policy 113 to the bit mask generation module 12 (S313).

The operation then proceeds from step S313 to S314, wherein the bit mask generation module 12 requests the document profile 112 from the security management module 11. The security management module 11 outputs the document profile 112 to the bit mask generation module 12 (S315).

The operation then proceeds from step S315 to S316, wherein the bit mask generation module 12 generates the bit mask 13 based on the information acquired in steps S311, S313 and S315. Specifically, the operations in FIG. 13 are executed. In step S316, if the certificate 114 is required, the bit mask generation module 12 retrieves the certificate 114 from the security management module 11.

In this way, the security management server 10 in the first embodiment can generate the bit mask 13 indicating the reference permission status of specific users to each document based on plural kinds of security information such as the user profile 111, the document profile 112, the policy 113 and the certificate 114. Therefore, the document management server 20 can efficiently provide a list of documents.

The users in the user profile 111 and the documents in the document profile 112 may be classified in various other ways. For example, the users may be classified based on various information items that can be used as user attribute such as position, age and gender. Likewise, the documents may be classified based on various information items that can be used as document attributes such as life cycle and creation date. The users and documents in the policy 113 may be therefore classified in various ways.

The bit mask 13 may include various access permissions other than reference permission. For example, for searching for documents with reference permission and update permission at high speed, the bit mask 13 is so configured that a bit with both of the reference permission and the update permission is set to ON.

The following describes a second embodiment for increasing the speed of the operations for generating the bit mask 13.

Figure 15:
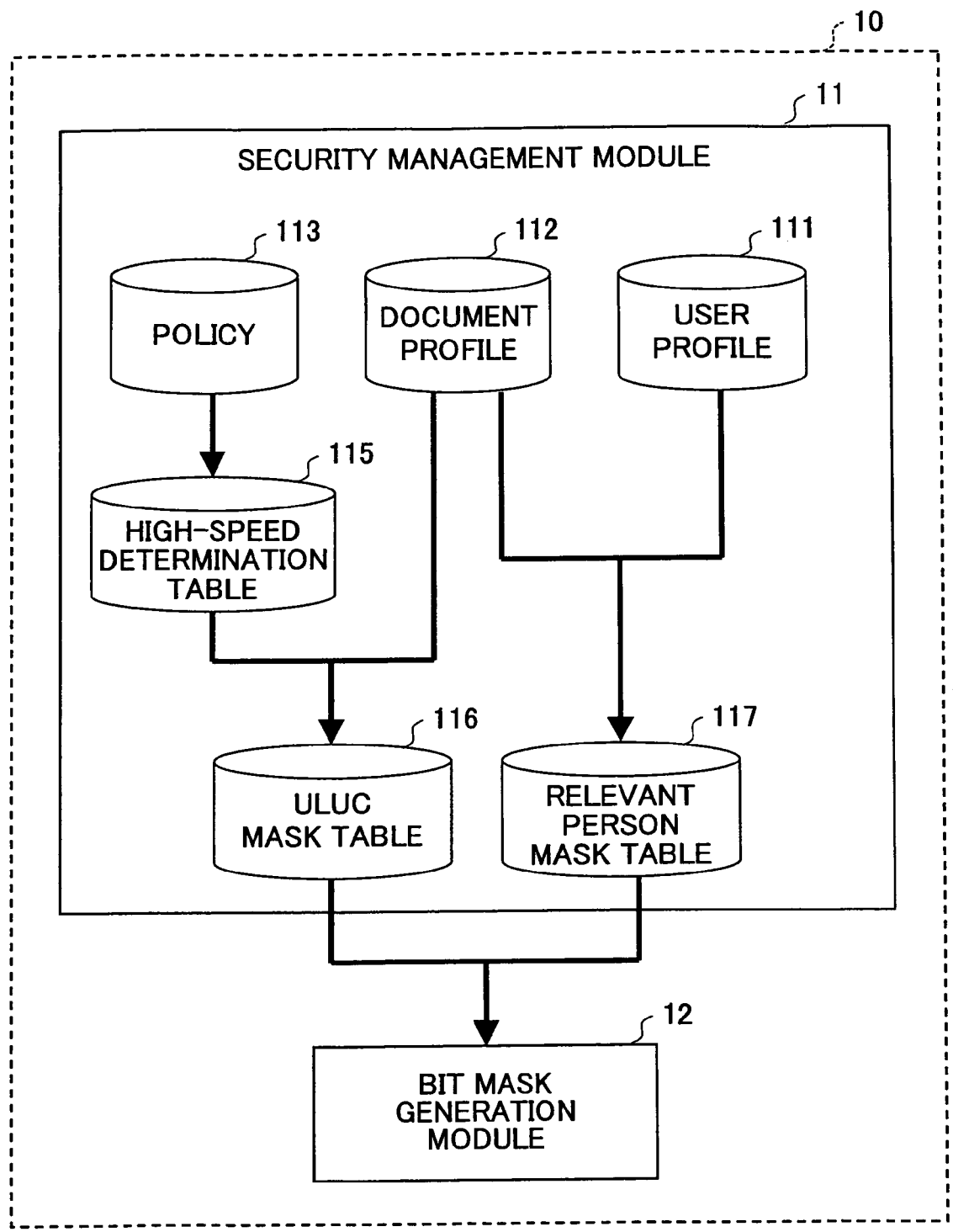
FIG. 15 is a functional diagram of a security management server according to a second embodiment.

FIG. 15 is a functional diagram of a security management server 10 according to the second embodiment.

In FIG. 15, elements identical to those in FIG. 5 are denoted by the same reference numerals, and are not further described. The security management module 11 shown in FIG. 15 further comprises a high-speed determination table 115, a ULUC (User Level User Category) mask table 116, and a relevant person mask table 117.

FIG. 16 shows an example of the high-speed determination table 115 according to the second embodiment. The high-speed determination table 115 is generated based on a policy 113, indicating reference permission status (i.e. whether a user has reference permission or not) with respect to each combination of document category, confidential level of a document, user level and user category as shown in FIG. 16. The document category is information that classifies documents by the type of the documents. The user level is information that classifies users by their positions. The user category is information that classifies the users based on whether the user has a predetermined relation with a document or not (e.g., whether the user is "relevant" or not). The document category and the user level are not used in the first embodiment. Therefore, if based on the user profile 111, the document profile 112 and the policy 113 in the first embodiment, the high-speed determination table 115 shows the reference permission status with respect to each combination of confidential level and user category. The reason for adding the document category and the user level herein is to show a variation of the document/user classification, and it will not affect the nature of the second embodiment.

According to the high-speed determination table 115 in FIG. 16, managers and permanent employees have reference permission to a conference note even if they are not relevant to the conference note (lines 1 through 4), whereas temporary employees have reference permission only if they are relevant thereto (lines 5 and 6).

FIG. 17 shows an example of the ULUC mask table 116 according to the second embodiment. The ULUC mask table 116 is generated based on the high-speed determination table 115 and the document profile 112, comprising a bit sequence that indicates the reference permission status to each document (document 1 through document N) with respect to each combination of the user level and the user category as shown in FIG. 17. For example, according to the UCUL mask table 116 in FIG. 17, a manager with the user category "relevant" has the reference permission to a document 1, a document 2, a document 4, and a document N. If the user level is not contained, the ULUC mask table 116 is information indicating the reference permission status to each document based on a relation between a user and a document.

FIG. 18 shows an example of the relevant person mask table 117 according to the second embodiment. The relevant person mask table 117 is created for each user, comprising a bit sequence that indicates whether the user or a group to which the user belongs is relevant to a document as shown in FIG. 18. For example, according to the relevant person mask table 117 in FIG. 18, a user A is relevant to a document 1, a document 3, and a document N, but is not relevant to a document 2 and document 4.

Figure 19:
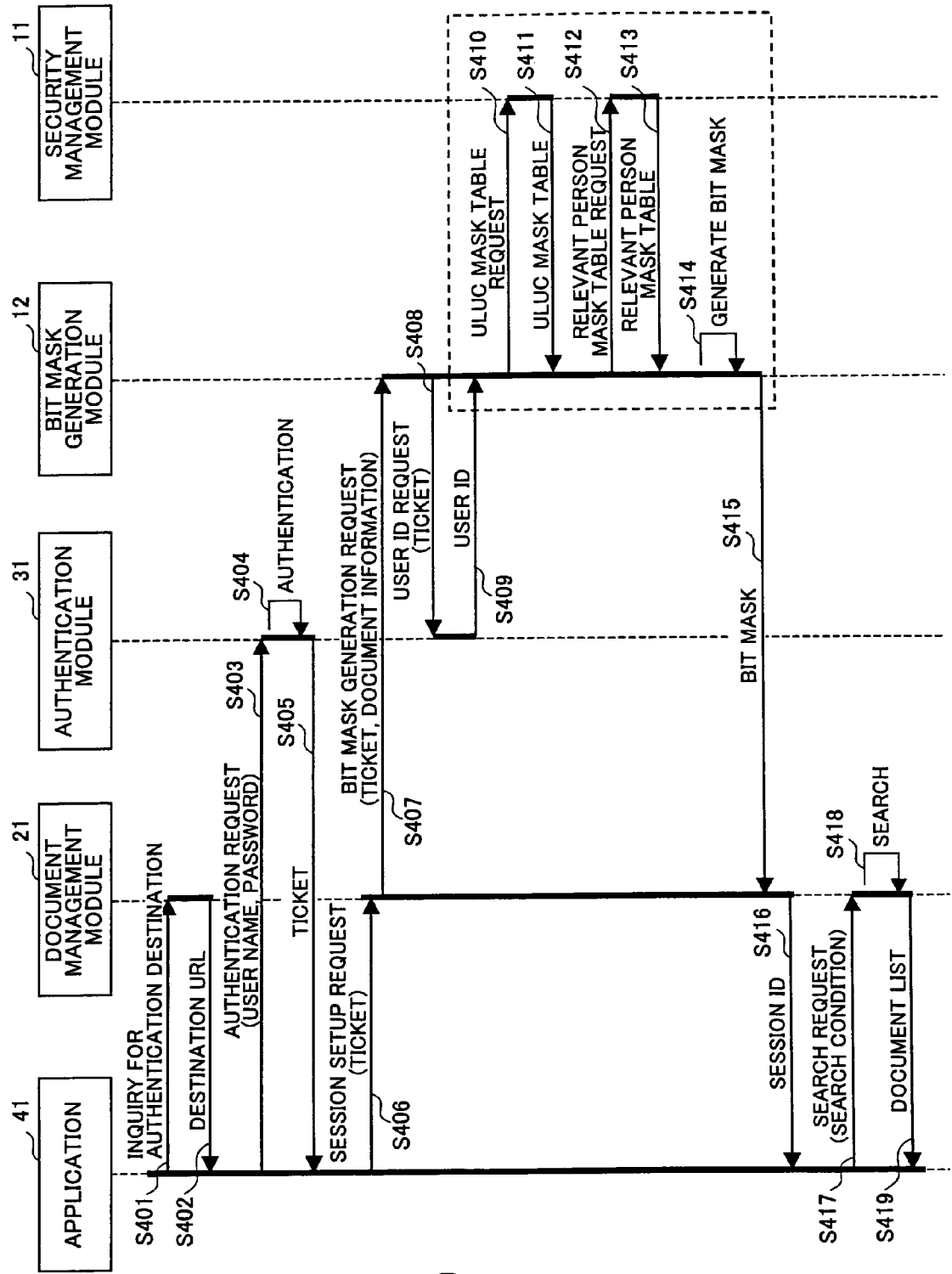
FIG. 19 is a sequence diagram showing operations in a document search in the document management system according to the second embodiment.

The following describes operating procedures in the second embodiment. FIG. 19 is a sequence diagram showing operations for a document search in the document management system according to the second embodiment.

In FIG. 19, steps S410 through S414 are substitutions for steps S310 to S316 in FIG. 14, and operations except these are the same as in FIG. 14. Therefore, only steps S410 thorough S414 are discussed below.

In step S410, the bit mask generation module 12 requests for the ULUC mask table 116 from the security management module 11. The security management module 11 outputs the UCUL mask table 116 to the bit mask generation module 12 (S411).

The operation then proceeds from step S411 to S412, wherein the bit mask generation module 12 requests, with presentation of the user ID, for the relevant person mask table 117 from the security management module 11. The security management module 11 outputs the relevant person mask table 117 to the bit mask generation module 12 (S413).

The operation then proceeds from step S413 to S414, wherein the bit mask generation module 12 generates the bit mask 13 based on the ULUC mask table 116 and the relevant person mask table 117 acquired in steps S411 and S413.

Figure 20:
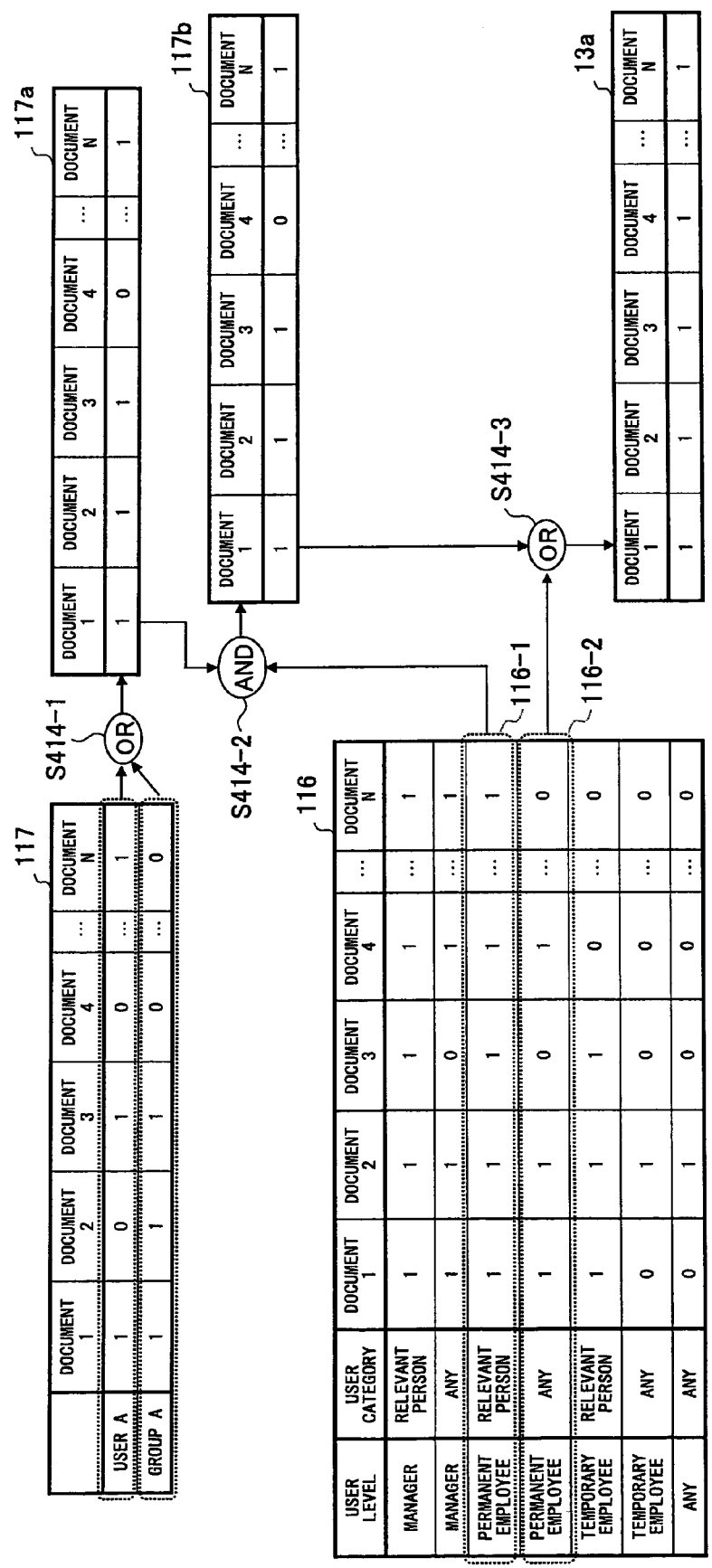
FIG. 20 is a chart showing operations for generating a bit mask according to the second embodiment.

The operations for generating the bit mask 13 in step S414 are described in detail with reference to FIG. 20. FIG. 20 is a chart showing the operations for generating the bit mask 13 according to the second embodiment. Assume that, in FIG. 20, the user name of a current user, the name of the group to which the current user belongs, and the user level are respectively a user A, a group A and a permanent employee.

First, the logical OR of a bit sequence for the user A in the relevant person mask table 117 and a bit sequence for the group A is computed to generate a bit sequence 117a (third truth-value sequence) (S414-1). In the bit sequence 117a, "true" is set if at least the user A or the group A is relevant to a document. This means, in the case that the group A is relevant to the document, the user A is considered as a person relevant to the document even if the user A itself is not relevant thereto.

Subsequently, the logical AND of a bit sequence 116-1 for the user A in the UCUL mask table 116 and the bit sequence 117a is computed to generate a bit sequence 117b (first truth-value sequence) (S414-2). The bit sequence 116-1 herein indicates the reference permission status of the user A to each document, in the case that the user A as a permanent employee is categorized as a relevant person. In the bit sequence 117b, "true" is set if the user A or the group A is relevant to a document and also has reference permission thereto.

Further, the logical OR of a bit sequence 116-2 for the user A in the UCUL mask table 116 and the bit sequence 117b is computed to generate the a bit mask 13a (second truth-value sequence) (S414-3). Herein, the bit sequence 116-1 indicates the reference permission status of the user A to each document in the case that the user A as a permanent employee is categorized as an "ANY" person including both of a relevant person and a non-relevant person. Namely, in this step, the bit mask 13a is generated in order to correctly indicate the reference permission to a document that should be given to any person without limiting a relevant person.

In this way, the security management server 10 in the second embodiment can generate the bit mask 13a at high speed by defining the ULUC mask table 116 and the relevant person mask table 117 in advance.

The following is a third embodiment in which "owner" is added to the user category. The term "owner" used herein shall mean an owner of a document.

Figure 21:
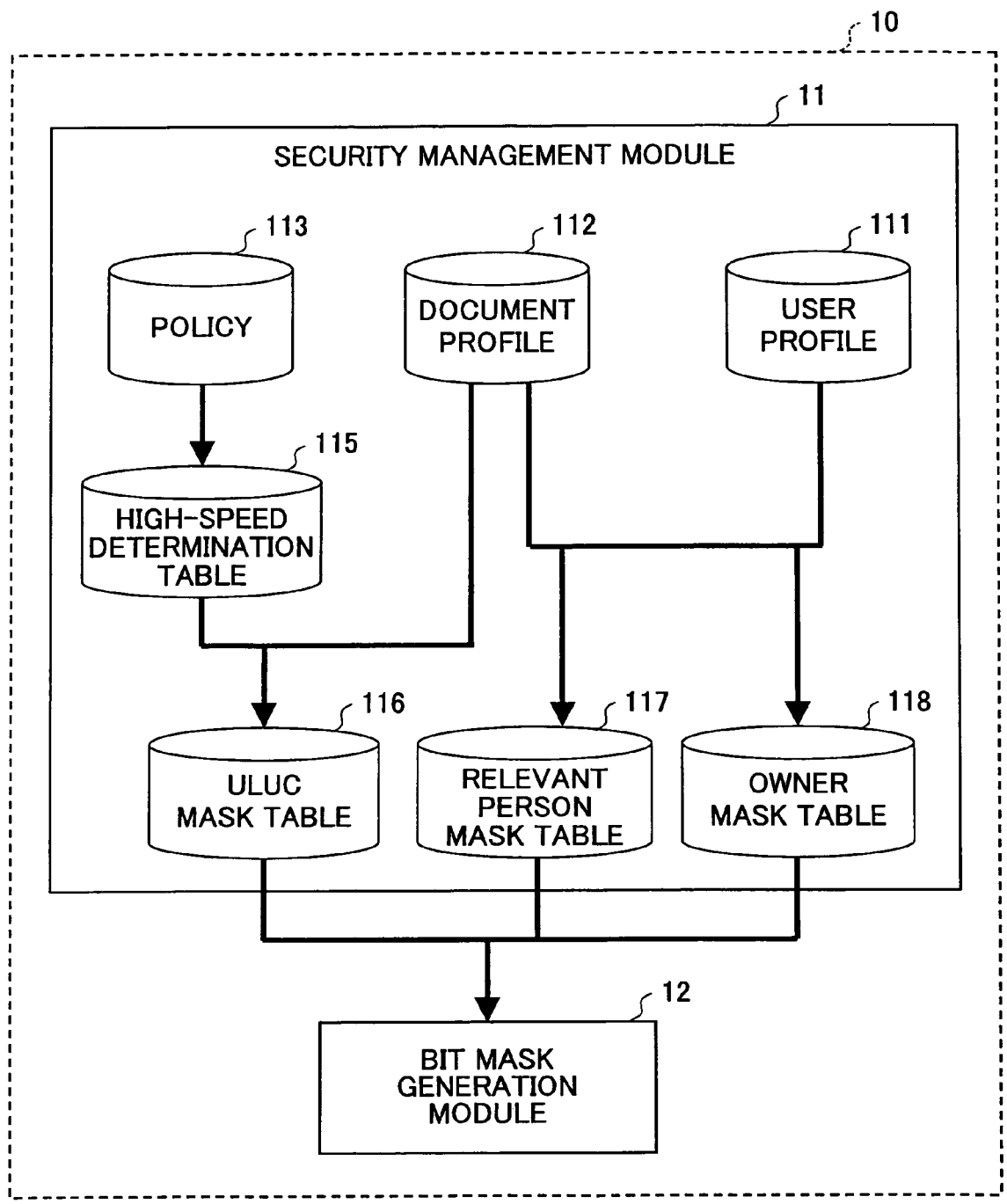
FIG. 21 is a functional diagram of a security management server according to a third embodiment.

FIG. 21 is a functional diagram of a security management server 10 according to a third embodiment. In FIG. 21, elements identical to those in FIG. 15 are denoted by the same reference numerals, and are not further described. The security management module 11 shown in FIG. 21 further comprises an owner mask table 118.

FIG. 22 shows an example of the owner mask table 118 according to the third embodiment. As shown in FIG. 22, the owner mask table 118 is created for each user, comprising a bit sequence that indicates whether the user or a group to which the user belongs is an owner of the document. For example, according to the owner mask table 118, a user A owns a document 1 and a document N, but does not own a document 2, a document 3 and document 4.

Adding the item "owner" to the user category brings some changes to the high-speed determination table 115 and the ULUC mask table 116.

FIG. 23 shows an example of the high-speed determination table 115 according to the third embodiment. In the high-speed determination table 115 shown in FIG. 23, combinations for "owner" in the user category are added (lines 1, 4, 7 and 12).

FIG. 24 shows an example of the ULUC mask table 116 according to the third embodiment. Likewise, in the ULUC mask table 116 shown in FIG. 24, combinations for "owner" in the user category are also added (lines 1, 4, and 7).

As for the relevant person mask table 117, adding the owner to the user category does not bring any change.

The following describes operating procedures in the third embodiment. The operating procedures are generally the same as in the second embodiment (FIG. 19), and the identical operations are not further described. In the third embodiment, in step S412 and step S413, the bit mask generation module 12 retrieves the owner mask table 118 together with the relevant person mask table 117 from the security management module 11. In step 414, the bit mask 13 is generated based on the UCUL mask table 116, the relevant person mask table 117 and the owner mask table 118.

Figure 25:
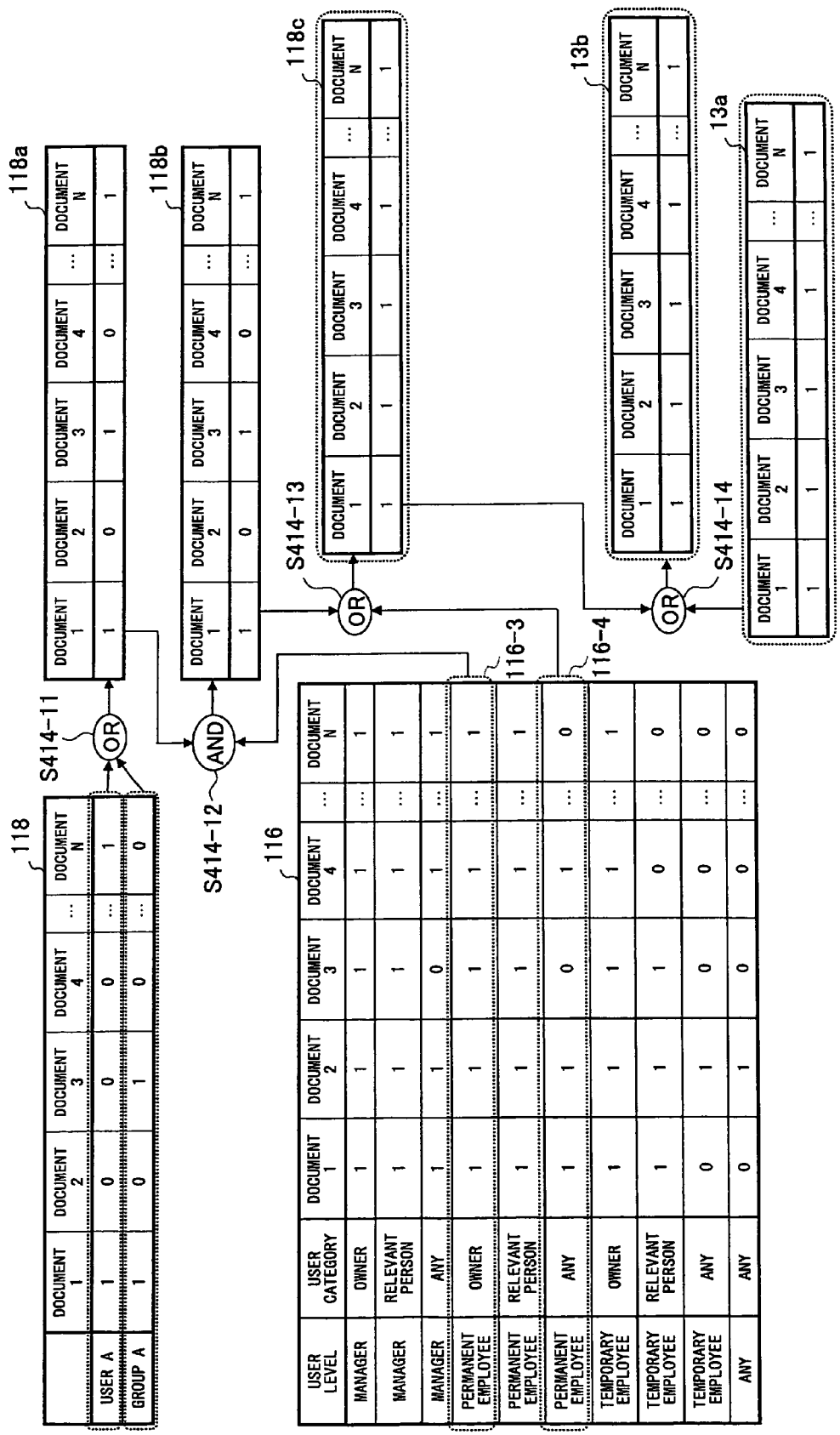
FIG. 25 is a chart showing operations for generating a bit mask according to the third embodiment.

FIG. 25 is a chart showing the operations for generating the bit mask 13 according to the third embodiment. Assume that, in FIG. 25, the user name of a current user, the name of the group to which the current user belongs, and the user level are respectively a user A, a group A and a permanent employee.

First, the logical OR of a bit sequence for the user A in the owner mask table 118 and a bit sequence for the group A is computed to generate a bit sequence 118a (third truth-value sequence) (S414-11). In the bit sequence 118a, "true" is set if at least the user A or the group A owns a document. This means, in the case that the group A owns the document, the user A is considered as an owner of the document even if the user A itself does not own the document.

Subsequently, the logical AND of a bit sequence 116-3 for the user A in the UCUL mask table 116 and the bit sequence 118a is computed to generate a bit sequence 118b (first truth-value sequence) (S414-12). The bit sequence 116-3 herein indicates the reference permission status of the user A to each document, in the case that the user A as a permanent employee is categorized as an owner. In the bit sequence 118b, "true" is set if the user A or the group A owns a document and also has reference permission thereto.

Further, the logical OR of a bit sequence 116-4 for the user A and the bit sequence 118b is computed to generate the a bit sequence 118c (second truth-value sequence) (S414-13). The bit sequence 116-5 herein indicates the reference permission status of the user A to each document in the case that the user A as a permanent employee is categorized as an "ANY" person including an owner or a non-owner. The bit sequence 118c corresponds to the bit mask 13 that is based only on whether the user A is an owner or not in the user category, and corresponds to the bit mask 13a (FIG. 20) that is based on whether the user A is a person relevant to the document or not.

Accordingly, the logical OR of the bit sequence 118c and the bit mask 13a (FIG. 20) is computed to generate a bit mask 13b (fourth truth-value sequence) that is based on whether the user A or the group A is an owner of or a person relevant to the document (S414-14). That is, in the case that a new item is added to the user category, a bit mask for the new item is generated and the logical OR of each bit mask is computed.

In this way, even if the number of the items in user category is increased, the security management server 10 in the third embodiment can generate the bit mask 13 at high speed by executing the logical operations similar to those in the second embodiment. Therefore, various classifications of subjects (users) and resources (documents) are applicable in the present invention according to intended use without being limited to those exemplified classifications in the above embodiments.

While the present invention has been described in terms of preferred embodiments, it will be apparent to those skilled in the art that variations and modifications may be made without departing from the scope of the invention as set forth in the accompanying claims.

The present application is based on Japanese Priority Application No. 2004-036822 filed on Feb. 13, 2004 and Japanese Priority Application No. 2005-006651 filed on Jan. 13, 2005, with the Japanese Patent Office, the entire contents of which are hereby incorporated by reference.

What is claimed is:

1. An information processing apparatus, comprising:
a permission status information generating part including a processor to generate permission status information based on resource classification information, subject classification information, and rule information;
the permission status information indicating whether a subject trying to access resources has predetermined access permission to the respective resources,
the resource classification information including information on classifications of the resources to be accessed,
the subject classification information including information on a classification of the subject trying to access the resources, and
the rule information defining a rule for the subject to access the resources with respect to a combination of the classifications of the resources and the classification of the subject.

2. The information processing apparatus as claimed in claim 1, wherein the rule includes information indicating the status of the predetermined access permission.

3. The information processing apparatus as claimed in claim 1, wherein the rule includes information indicating an obligation that the subject must fulfill when accessing the resource.

4. The information processing apparatus as claimed in claim 1, wherein the permission status information comprises a bit sequence that includes bits indicating the status of the predetermined access permission to the respective resources.

5. The information processing apparatus as claimed in claim 1, wherein the resource classification information defines a confidential level of the respective resources.

6. The information processing apparatus as claimed in claim 1, wherein the resource classification information includes a definition to associate the resources with respective organizations in charge thereof.

7. The information processing apparatus as claimed in claim 1, wherein the subject classification information includes a definition to associate the subject with respective organizations with which the subject has a predetermined relation.

8. The information processing apparatus as claimed in claim 7, wherein the rule information defines a rule for the subject to access the resource with respect to a combination of the confidential level of the resource and the information indicating whether the subject is a person relevant to the resource.

9. The information processing apparatus as claimed in claim 8, wherein if an organization in charge of the resource is identical to the organization with which the subject has the predetermined relation, the permission status information generating part determines that the subject is a person relevant to the resource.

10. The information processing apparatus as claimed in claim 1, wherein if the permission status information generating part determines that the subject does not have the predetermined access permission to the resource based on the rule information and if additional permission information defining additional permission that is not defined in the rule information defines the predetermined access permission to the resource for the subject, the permission status information generating part generates the permission status information based on the additional permission information.

11. The information processing apparatus as claimed in claim 1, wherein the rule information is defined in XACML.

12. The information processing apparatus as claimed in claim 1, wherein the predetermined access permission is reference permission for referring to the resource.

13. An information processing apparatus, comprising:
a permission status information generating part including a processor to generate second permission status information indicating whether a subject has predetermined permission to access resources, based on first permission status information indicating the status of the predetermined permission on a resource basis in accordance with whether at least the subject has a predetermined first relation with respective resources, based on resource classification information on classifications of the resources to be accessed and rule information defining a rule for the subject to access the resources with respect to a combination of the classifications of the resources and a classification of the subject trying to access the resources; and
first relation status information indicating whether the subject has the predetermined first relation with the respective resources, based on the resource classification information and subject classification information on the classification of the subject.

14. The information processing apparatus as claimed in claim 13, wherein the permission status information generating part
generates a first truth-value sequence by performing logic operations so as to set TRUE if the subject has the predetermined permission and the predetermined relation and set FALSE if otherwise, based on information included in the first permission status information to indicate the status of the predetermined permission on the resource basis when the subject has the predetermined first relation with the resources, and the first relation status information for the subject;
generates a second truth-value sequence by performing logic operations so as to set TRUE if a value in the first truth-value sequence is TRUE or if the subject has the predetermined permission and set FALSE if otherwise, based on the first truth-value sequence and information included in the first permission status information to indicate the status of the predetermined permission for respective resources on the resource basis when the subject does not have the predetermined first relation with the resources; and
sets the second truth-value sequence as the second permission status information.

15. The information processing apparatus as claimed in claim 14, wherein the first relation status information comprises
first relation status information indicating whether a user as the subject has the predetermined first relation with the respective resources; and first relation status information indicating whether a group to which the user as the subject belongs has the predetermined first relation with the respective resources, and the permission status information generating part generates a third truth-value sequence by performing logic operations on the resource basis so as to set TRUE if at least the user or the group has the predetermined first relation and set FALSE if otherwise, based on the first relation status information for the user and the first relation status information for the group; and the first truth-value sequence based on information included in the first permission status information to indicate the status of the predetermined permission on the resource basis when the subject has the predetermined first relation with the resources and the third truth-value sequence.

16. The information processing apparatus as claimed in claim 14, wherein the permission status information generating part:

based on the second truth-value sequence generated in relation to the predetermined first relation, and another second truth-value sequence generated in relation to a predetermined second relation between the subject and the resources in the same manner as the predetermined first relation, generates a fourth truth-value sequence by performing logic operations on the resource basis so as to set TRUE if at least the former or latter second truth-value sequence is TRUE and set FALSE if otherwise; and sets the fourth truth-value sequence as the second permission status information.

17. An information processing method executable by a computer, comprising:

a resource classification identifying step identifying classifications of resources to be accessed based on resource classification information on the classifications of the resources;

a subject classification identifying step identifying a classification of a subject trying to access the resources based on subject classification information on the classifications of the subject; and a permission status information generating step generating permission status information indicating whether the subject trying to access the resources has predetermined access permission, based on rule information defining a rule for the subject to access the resources with respect to a combination of the classifications of the resources and the classification of the subject.

18. The information processing method as claimed in claim 17, wherein the rule includes information indicating the status of the predetermined access permission.

19. The information processing method as claimed in claim 17, wherein the rule includes information indicating an obligation that the subject must fulfill when accessing the resource.

20. The information processing method as claimed in claim 17, wherein the permission status information comprises a bit sequence that includes bits indicating the status of the predetermined access permission to the respective resources.

21. The information processing method as claimed in claim 17, wherein the resource classification information defines a confidential level of the respective resources.

22. The information processing method as claimed in claim 17, wherein the resource classification information includes a definition to associate the resources with respective organizations in charge thereof.

23. The information processing method as claimed in claim 17, wherein the subject classification information includes a definition to associate the subject with respective organizations with which the subject has a predetermined relation.

24. The information processing method as claimed in claim 23, wherein the rule information defines a rule for the subject to access the resource with respect to a combination of the confidential level of the resource and the information indicating whether the subject is a person relevant to the resource.

25. The information processing method as claimed in claim 24, wherein if an organization in charge of the resource is identical to the organization with which the subject has the predetermined relation, the subject is determined as a person relevant to the resource in the subject classification identifying step.

26. The information processing method as claimed in claim 17, wherein if it is determined that the subject does not have the predetermined access permission to the resource based on the rule information and if additional permission information defining additional permission that is not defined in the rule information defines the predetermined access permission to the resource for the subject, the permission status information is generated based on the additional permission information in the permission status information generating step.

27. The information processing method as claimed in claim 17, wherein the rule information is defined in XACML.

28. The information processing method as claimed in claim 17, wherein the predetermined access permission is reference permission for referring to the resource.

29. An information processing method executable by a computer, comprising:

a first permission status information acquiring step acquiring first permission status information indicating the status of predetermine permission on a resource basis in accordance with whether at least a subject has a predetermined first relation with respective resources, based on resource classification information on classifications of the resources to be accessed and rule information defining a rule for the subject to access the resources with respect to a combination of the classifications of the resources and a classification of the subject trying to access the resources;

a first relation status information acquiring step acquiring first relation status information indicating whether the subject has at least the predetermined first relation with the respective resources, based on the resource classification information and subject classification information on the classification of the subject; and a permission status information generating step generating second permission status information indicating whether the subject has the predetermined permission to the resources based on the first permission status information and the first relation status information.

30. The information processing method as claimed in claim 29, wherein the permission status information generating step comprises:

a first truth-value sequence generating step generating first truth-value sequence by performing logic operations so as to set TRUE if the subject has the predetermined permission and the predetermined relation and set FALSE if otherwise, based on information included in the first permission status information to indicate the status of the predetermined permission on the resource basis when the subject has the predetermined first relation with the resources, and the first relation status information for the subject; and a second truth-value sequence generating step generating a second truth-value sequence by performing logic operations so as to set TRUE if a value in the first truth-value sequence is TRUE or if the subject has the predetermined permission and set FALSE if otherwise, based on the first truth-value sequence and information included in the first permission status information to indicate the status of the predetermined permission for respective resources on a resource basis when the subject does not have the predetermined first relation with the resources, and wherein the second truth-value sequence is set as the second permission status information.

31. The information processing method as claimed in claim 30, wherein the first relation status information comprises first relation status information indicating whether a user as the subject has the predetermined first relation with the respective resources, and first relation status information indicating whether a group to which the user as the subject belongs has the predetermined first relation with the respective resources, the permission status information generating step includes a third truth-value sequence generating step to generate a third truth-value sequence by performing logic operations on the resource basis so as to set TRUE if at least the user or the group has the predetermined first relation and set FALSE if otherwise, based on the first relation status information for the user and the first relation status information for the group, and the first truth-value sequence generating step generates the first truth-value sequence based on information included in the first permission status information to indicate the status of the predetermined permission on the resource basis when the subject has the predetermined first relation with the resources and the third truth-value sequence.

32. The information processing method as claimed in claim 30, wherein the permission status information generating step, based on the second truth-value sequence generated in relation to the predetermined first relation, and another second truth-value sequence generated in relation to a predetermined second relation between the subject and the resources in the same manner as the predetermined first relation, generates a fourth truth-value sequence by performing logic operations on the resource basis so as to set TRUE if at least the former or latter second truth-value sequence is TRUE and set FALSE if otherwise, and wherein the fourth truth-value sequence is set as the second permission status information.

33. A computer-readable medium having a computer-executable information processing program embodied therein, the program, when executed by a computer processor, causing the processor to execute a method comprising:

a resource classification identifying step identifying classifications of resources to be accessed based on resource classification information on the classifications of the resources;

a subject classification identifying step identifying a classification of a subject trying to access the resources based on subject classification information on the classification of the subject; and a permission status information generating step generating permission status information indicating whether the subject trying to access the resources has predetermined access permission, based on rule information defining a rule for the subject to access the resources with respect to a combination of the classifications of the resources and the classification of the subject.

34. A computer-readable medium having a computer-executable information processing program embodied therein, the program, when executed by a computer processor, causing the processor to execute a method comprising:

a first permission status information acquiring step acquiring first permission status information indicating the status of predetermine permission on a resource basis in accordance with whether at least a subject has a predetermined first relation with respective resources, based on resource classification information on classifications of the resources to be accessed and rule information defining a rule for the subject to access the resources with respect to a combination of the classifications of the resources and a classification of the subject trying to access the resources;

a first relation status information acquiring step acquiring first relation status information indicating whether the subject has at least the predetermined first relation with the respective resources, based on the resource classification information and subject classification information on the classification of the subject; and a permission status information generating step generating second permission status information indicating whether the subject has the predetermined permission to the resources based on the first permission status information and the first relation status information.

35. The apparatus according to claim 1, further comprising:

a searching part including a processor to extract, in response to a request for information on a list of the resources, the resources for which predetermined access permission is given to a subject who makes the request based on the permission status information, and to provide information on a list of the extracted resources.

36. The resource management apparatus as claimed in claim 35, wherein the predetermined access permission is reference permission for referring to the resource.

* * * * *